INVENTORS
PETER P. TONG
RICHARD H. THOMAS
BY *Irwin C. Alter*
ATTORNEY

INVENTORS
PETER P. TONG
RICHARD H. THOMAS

BY *Irwin C. Alter*

ATTORNEY

United States Patent Office 3,461,724
Patented Aug. 19, 1969

3,461,724
TEMPERATURE MEASURING SYSTEM
Peter P. Tong and Richard H. Thomas, Madison, Wis., assignors to T & T Technology, Inc., Madison, Wis.
Filed Jan. 16, 1967, Ser. No. 609,483
Int. Cl. G01k 5/18, 5/52
U.S. Cl. 73—362          13 Claims

ABSTRACT OF THE DISCLOSURE

A temperature measuring system of a hybrid discrete state servo type which includes a rebalancing bridge containing a thermistor in one arm. The bridge is energized by a pulse generator. A stepping motor is activated by the output pulses from the bridge which form an error signal. The stepping motor drives a rebalancing potentiometer and activates a digital indicator.

---

Although the invention in its broader aspects has many advantageous features and many applications, for definiteness of disclosure it will be described in conjunction with a presently preferred specific embodiment: a human temperature taking and displaying system. This embodiment is designed for use by medical doctors or nurses and allows them to quickly, positively and sanitarily take the temperature of a patient.

It is good medical practice in modern hospitals to periodically take the temperature of the patients. This is presently done by a nurse travelling about the ward to each patient and inserting a glass-mercury therometer in his or her mouth. This type of thermometer must be held by the patient for a considerable length of time to insure that it has reached the patient's body temperature. After the nurse has waited the proper period she must remove the thermometer and read and record the temperature. Before using the thermometer on another patient it must be sterilized. This method of taking temperature is inherently time consuming and is subject to human error in reading the thermometer. The mercury-glass thermometer also has the disadvantage of being subject to easy breakage presenting a safety hazard in the hospitals.

One use for the invention would be in modern busy hospitals to allow a nurse speedily taking the temperature of patients during rounds. The present invention has the advantage of greatly speeding the process of taking a patient's temperature and consequently materially increases the efficient use of nurses' and doctors' time.

Thermistor temperature measuring devices are known and used for human temperature measuring purposes. These prior art thermistor measuring devices are commonly excited by means of a constant current source and the voltage resulting from the thermistor is fed to a voltmeter or analog-to-digital converter and from there to a display device. These known devices are not commonly employed in hospitals or medical office practice because of the relatively great expense of their analog-to-digital converter, digital display and associated circuitry. The relatively large amount of electric power these devices require renders a portable device impractical. A further drawback of such devices is the fact that continuous current through their thermistors creates a self-heating error. In some applications this error may be safely ignored, however, in others such as human temperature sensing it must be dealt with often at the price of more expensive and bulky circuitry.

It is therefore an object of the present invention to provide a new and improved temperature measuring control system that overcomes one or more of the disadvantages of the prior art.

It is a primary object of the present invention to provide a new and improved measuring and control system that may be usefully adapted to many environments.

In accordance with the broader aspects of the invention a measuring and control system is provided comprising a start signal source coupled for starting a signal source to produce a train of sampling pulses in response to the start signal source actively associated with a sensing transducer circuit and a comparison circuit. Means are coupled to both circuits for comparing the status or responses to the pulses thereof and for producing an error signal. Drive means are provided responsive to the error signal to alter, in discrete steps, the impedance of the comparison circuit to, bring into response to the pulses from the second signal source into a predetermined relationship with the response of the sensing transducer circuit to the pulses. And means are provided for stopping the pulse signal source when the response of the comparison circuit is in the predetermined relationship with the response of the sensing circuit.

In a preferred application of the system of invention, the start source comprises a manually operated push button, the sensing transducer circuit includes a thermistor in the form of a probe to be used for inserting in an environment, such as a human patient's mouth, whose temperature is to be sensed and a display device is ganged to the drive means and correlated therewith to display an indication of the temperature sensed.

In accordance with one aspect of the invention the drive means is a stepping motor which is moved and those direction of movement, clockwise or counterclockwise, is determined by the error signal and which motor is driven one step for each pulse generated by the pulse source.

In accordance with another aspect of the invention a thermistor probe is provided as the sensing element which probe may be encased in a sterile disposable heat transferring boot so as to enable its use, with different boots, on a succession of human patients without the danger of communicating disease.

Figure 1:
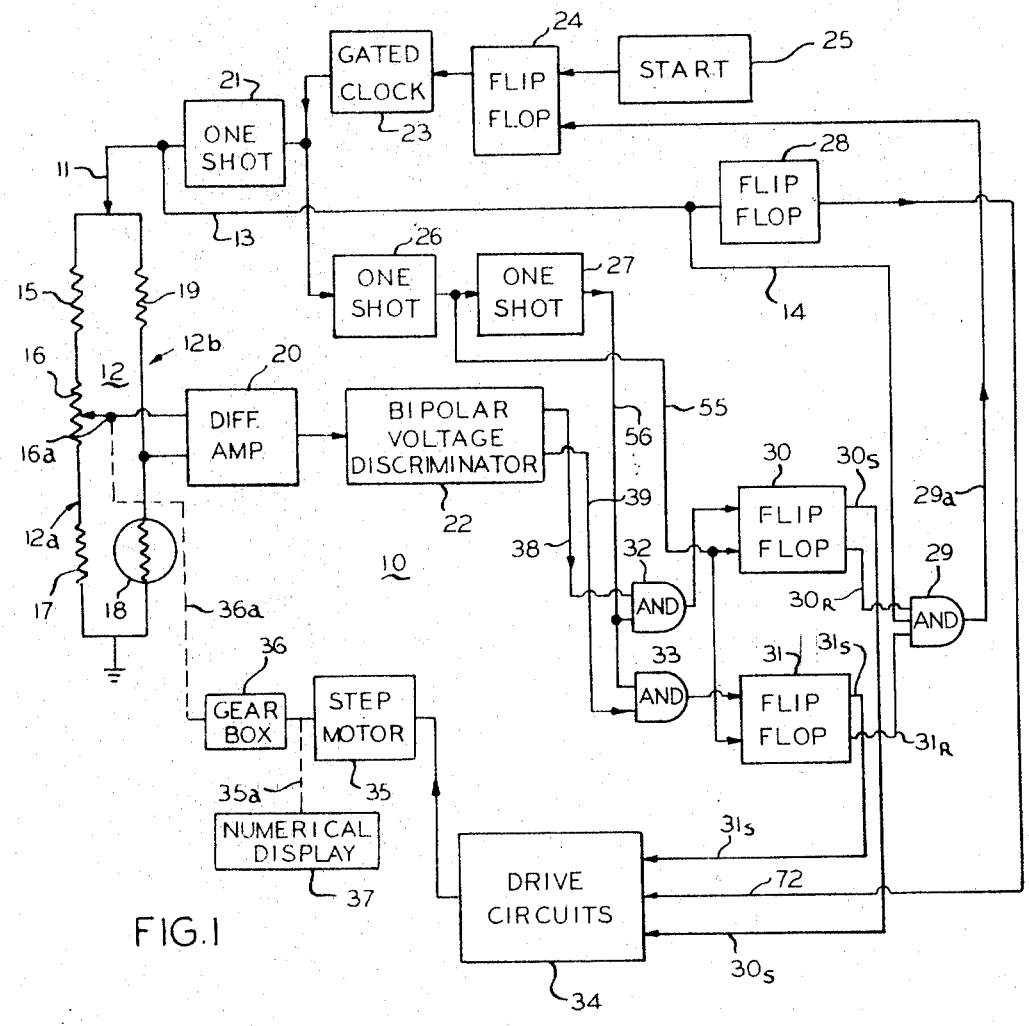
FIG. 1 is block schematic diagram illustrating the overall operation of a temperature measuring and control system constructed in accordance with the present invention.

Referring to FIG. 1 a system constructed in accordance with the invention is depicted and is generally indicated by the numeral 10. The system 10 includes a starting signal source 25, which may be a conventional push button switch, coupled to a set-reset flip-flop 24. The flip-flop 24 is coupled to a gated clock 23 for operating the same whenever the flip-flop 24 is set into one of its two stable conditions by a signal from the signal source 25. The gated clock 23 has its output coupled to a first monostable multi-vibrator or one slot 21 and also to a second monostable multi-vibrator or one shot 26. A one shot has the property of producing a predetermined sized pulse in response to its being excited by a signal of a sufficient magnitude. In this case the one shot 21 produces a narrow high amplitude pulse that is coupled as symbolized by the line 11, to a parallel circuit arrangement generally indicated by 12. The flip-flop 24, the gated clock 23 and the one shot 21 serves as a pulse train source as the one shot will produce a pulse in response to each clock pulse of the clock 23. The output of one shot 21 is also coupled as symbolized by the line 13, to a flip-flop 28 and symbolized by the line 14, to an "And" gate 29.

The circuit 12 comprises a first parallel leg 12a comprising a comparison resistance circuit and a second leg 12b comprising a sensing transducer circuit. The comparison circuit includes a first resistor 15 having one end coupled via line 11 to the one shot 21 pulse source and has its other end connected to one fixed end of a variable tapped resistor 16. The resistor 16 has the other fixed end connected through another resistor 17 to a plane of reference potential or ground. The variable center tap 16a of the resistor 16 tapping position is determined by a mechanical linkage, symbolized by the dashed line 36a, from a gearbox 36. The voltage present on that center tap 16a is coupled to one input of a differential amplifier 20.

The second leg 12b comprises a linearizing resistor 19 having one end connected to the pulse source 21 and at its other end to a transducer of the thermister type indicated by the numeral 18. The other end of thermistor 18 is grounded and the junction between the series connected thermistor 18 and resistor 19 is connected to the other input of the differential amplifier 20. The output of the differential amplifier 20 is an error signal and is coupled to a bi-polar voltage discriminator 22 which has two output lines 38 and 39. The bi-polar voltage discriminator 20 functions to place a signal on output line 38 (with no signal on line 39) whenever the output from the differential amplifier is of one polarity (positive) and to place a signal on output line 39 (with no signal on line 38) whenever the output from the differential amplifier 20 is of the other polarity (negative).

The line 38 is coupled to one input of an "And" gate 32 while the line 39 is coupled to an input of another "And" gate 33. The second inputs to each of the "And" gates 32 and 33 is a line 56 which is the output line from a one shot 27. The input circuit of the one shot 27 is in turn coupled to the output of the one shot 26.

The output of one shot 26 is also coupled on a line 55 to the reset inputs of the flip-flops 30 and 31. Each of the flip-flops 30 and 31 has a reset output signal line, designated 30R and 31R respectively which are also coupled as inputs to the "And" gate 29. The output of the "And" gate 29 is coupled via line 29a to the reset input of flip-flop 24.

The flip-flops 30 and 31 when in their "set" states produce signal outputs on their set output lines, designated 30S and 31S respectively, which are coupled to the drive circuits 34 of a step motor 35. A third input to the drive circuits 34 is derived from the flip-flop 28, output line 72. The drive circuits 34 are bi-directional and serve to activate the step motor 35 to move in increments or steps in either direction—clockwise or counterclockwise.

The step motor 25 is mechanically linked to drive the gear box 36 and also, as symbolized by the dashed line 35a, to drive a numerical display 37. The display 37 may be a conventional counter and is correlated to display a numeral temperature value equal to that sensed by the thermistor 18 when the signal from the tap 16a and the signal from the thermistor 18 in response to the pulses from one shot 21 are substantially the same. Reference may be had to pages 369 and 370 of the RCA Transistor Manual for circuits that may be employed in the one shot and flip-flop elements of the system 10.

In overall operation the system 10 operates, in response to a start signal from the source 25, to sense the temperature of the environment of transducer 18, as reflected in its resistance, to drive the numerical display 37 until the corresponding numerical temperature is displayed thereon and to then turn itself off to await the next start signal from source 25. The final or sensed temperature remains displayed on the counter 37 until the next temperature reading is taken.

Figure 2:
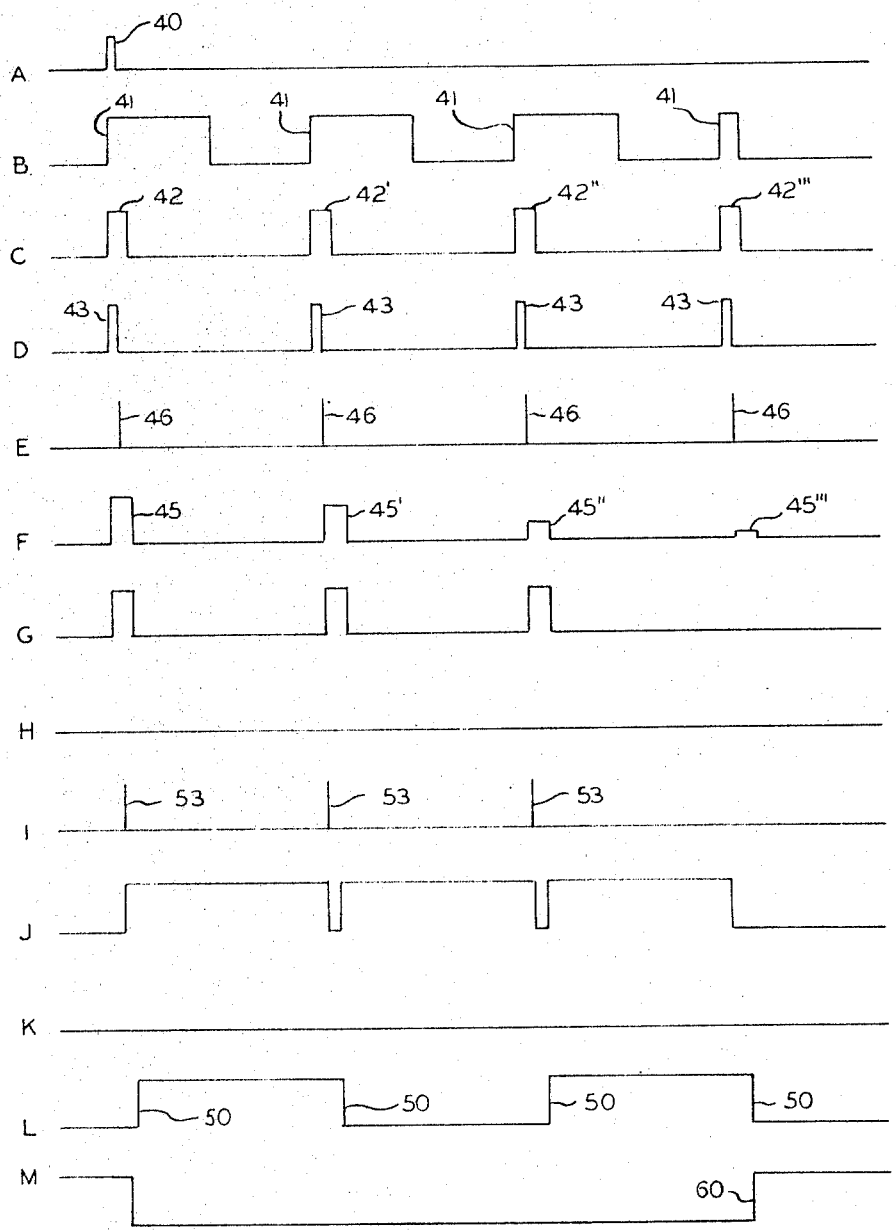
FIG. 2 is a waveform diagram illustrating the voltage output versus time at various parts of the system of FIG. 1 during an illustrational typical operation of the system.

At the signal from the source 25 the flip-flop 24 is set to produce an actuating signal which starts the gated clock 23. Referring to FIG. 2 the start signal is shown illustrated as a short pulse at 40 of the first waveform A. Of course, any waveform that reaches a sufficient value to set flip-flop 24 would suffice. The setting of flip-flop 24 starts the gated clock 23 which produces a cyclic square wave output signal shown at B in FIG. 2. The leading step 41 of each square wave triggers the one shot pulser 21 to produce the waveform shown at C with a pulse 42 occurring at the start of every clock cycle.

The leading edge 41 of each square wave of each cycle of the wave also initiates a pulse from one shot 26 to produce the waveform shown at C in FIG. 2 with a pulse 43 at the start of each cycle. The circuit parameters of the one shot 26 are such that it produces a pulse approximately one-third as wide as that of one shot pulser 21. The output pulses 43 from one shot 26 drives the one shot 27 to produce the waveform E comprising very narrow pulses 46 delayed slightly from the start of the pulses 42 of waveform C but occurring before the ending of the pulses 42.

The above described signals result in every case in which the temperature sensed by the thermistor is materially different from that corresponding to the setting of the tap 16a of the reference impedance circuit 12a. The output of the amplifier 20 depends upon the difference between the signal developed at the potentiometer tap 16a and that developed across the thermistor 18. This signal output from the amplifier 20 may then, in general, be positive or negative and be of any amplitude over a predetermined range.

As an example, let it be assumed that the setting of potentiometer tap 16a (and the corresponding reading of the display 37) is such that a positive different voltage pulse 45 shown at waveform E in FIG. 2 results.

The bi-polar voltage discriminator responds to this positive signal by putting out a corresponding pulse 52 depicted on waveform G in FIG. 2 on only the line 38 leading to the "And" gate 32. The output on line 39 leading to "And" gate 33 remains at zero as shown by waveform H of FIG. 2.

As the pulses 46 are fed via line 56 to both "And" gates 32 and 33 but only "And" gate 32 has both of its inputs supplied with a pulse only it passes a signal, shown as 53 in waveform I of FIG. 2 while the "And" gate 33 has no output. The output 53 of gate 32 sets flip-flop 30 to produce the resulting waveform J of FIG. 2 on line 30S while the output on line 31S, waveform K of FIG. 2, remains at zero. At the same time as these signals are fed to the drive circuits 34 the toggle flip-flop 28 is feeding a pair of square wave signals, one the inverse of the other, to the drive circuit 34 as symbolized by the line 72. One of these signals is depicted as waveform L in FIG. 2, it being a step 50 delayed from the start of the clock cycle 41.

The interaction between these signals in the drive circuit 34 operates to advance the stepping motor 35 a single step in the clockwise direction. This advance causes, through the gear box 36 and mechanical linkage 35a, the tap 16a of the variable resistor to advance in the direction to lessen the difference between its output and that of the thermistor 18 and also advances the display counter 37.

In less than one clock time period, then, a single step of the motor is caused to take place, during the next clock period a second sampling pulse, 42' in FIG. 2, is generated and, if the output from the transducer and the movable tap are still not in registry, as the output pulse shown at 45' in waveform F, FIG. 2, then the stepping motor is driven another step. The process is continued until the difference between the outputs of the thermistor and that of the reference impedance is below a certain threshold level (as at 45''' in waveform F of FIG. 2). This signal from the differential amplifier 20 is insufficient to activate the bi-polar voltage discriminator 22 and no signal results on either of the lines 38 and 39. Consequently neither flip-flop 30 or flip-flop 31 is set so that output lines 30R and 31R have a continuous output and a voltage step results (60 waveform M of FIG. 2) on line 29a resetting the flip-flop 24 and turning off the clock 23.

Figure 3:
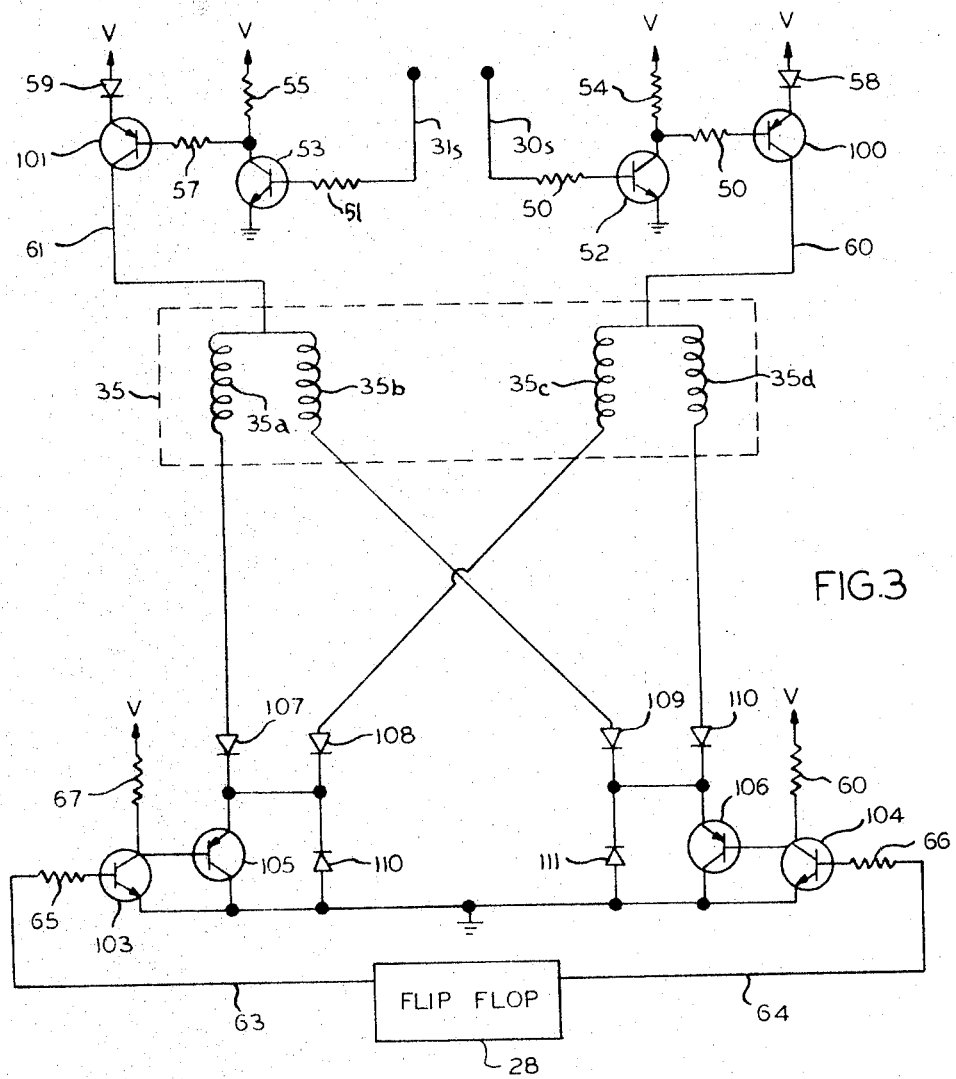
FIG. 3 is a schematic circuit diagram of a novel stepping motor control circuit that may be used as part of the system in FIG. 1.

Referring to FIG. 3 the construction and operation of the drive circuit and its connection with the coils of the stepping motor are shown in detail. The stepping motor 35 includes a pair center taped coils forming two pairs of coils 35a, 35b and 35c and 35d respectively. The coils 35a, 36b are the clockwise coils while coil pair 35c, 35d comprise the counterclockwise pair. It is the nature of the stepper motor 35 that if a current is flowing through one of its coils, for example, across coil 35a, the switching of that current to flow through the other coil 35b of the same pair results in a rotational "step" or movement of, e.g. 15°. In the case of coil pair 35a, 35b this step would be in the clockwise direction while for coil pair 35c, 35d this would be in the opposite direction or in the counterclockwise direction.

A unique activating circuit for the coils 35a, 35b, 35c, 35d is depicted and includes a control transistor 53 whose base is connected to line 31S through a current limit resister 51. The transistor 53 is of the NPN type and has its emitter grounded and its collector connected through a resistor 55 to a positive voltage source V. The transistor 53 is normally cut-off or nonconducting across its emitter-collector circuit except when a signal is present on line 31S.

Also connected to the collector of the control transistor 53 through a current limiting resistor 57 is the base of a controlled power transistor 101 the PNP type. The power transistor 101 has its emitter connected through a diode 59 to the source of positive voltage V. The diode 59 is arranged to allow conventional current flow only from the voltage source V to the emitter of the transistor 101. The collector of the transistor 101 is connected to a line 61 of which is also connected to the junction of series connected coils 35a and 36b. The controlled transistor 101 is so biased as to be cut-off or nonconducting across its emitter-collector circuit whenever the control transistor is not conducting. Hence current can flow through line 61 only when a signal is present on line 31S.

A second similar circuit is provided for controlling current to the junction of coil pair 35c and 35d. This circuit includes a control NPN transistor 52 whose base is connected through a resistor 50 to line 30S, whose emitter is grounded and whose collector is connected through a resistor 54 to a voltage source V. A second controlled PNP power transistor 100 is provided whose base is also connected through a resistor 50 to the emitter of transistor 52, whose emitter is connected through a diode 58 to source V and whose collector is connected to a line 60 which is in turn connected to the junction of coils 35c and 35d.

Thus, whenever a signal appears on line 31S positive potential is connected to the clockwise coils, 35a and 35b through the emitter-collector circuit of the power transistor 101 while whenever a signal is on line 30S positive potential is applied to counterclockwise coils 35c and 35d through the emitter-collector circuit of the power transistor 100.

At the lower part of FIG. 3 is depicted the circuitry that achieves the switching of current necessary to achieve the stepping action of the motor when coil pair 35a and 35b or coil pair 35c and 35d has positive potential applied to it. The output 72 from the toggle flip-flop 28 comprises an alternative step voltage output that is applied first on line 63 and then on line 64. The line 63 is connected through a current limiting resistor 65 to the base of a control transistor 103. The transistor 103 is of the NPN type and has its emitter grounded and its collector connected through a resistor 67 to a source of positive potential. The emitter of the control transistor 103 is connected to the base of a controlled transistor 105 of the power PNP type. Transistor 105 has its collector grounded and its emitter connected through a first diode 107 to the free end of coil 35a and through a second diode 108 to the free end of coil 35c. Diodes 107 and 108 each serve to allow current to flow essentially only from the coils to the emitter. A noise bypass diode 110 is connected between the collector of transistor 105 to allow negative current spikes to flow from the emitter to ground.

A similar circuit is provided between the free ends of coils 35b and 35d and the output line 64 of flip-flop 28 including a current limiting resistor 66 connected to the line 64 and to the base of a control NPN transistor 104 whose emitter is grounded and whose collector is connected through a resistor 60 to a source of position potential and also to the base of a controlled power PNP transistor 106 whose collector is grounded and whose emitter is connected through a first diode 109 to the free end of coil 35b and through a second diode 110 to coil 35d and through a noise suppression diode 111 to ground. All of the diodes 109, 110 and 111 are so connected as to allow conventional current therethrough to flow into the emitter of transistor 106.

The circuits between the coils and the toggle flip-flop 28 serve to allow current to flow alternatively through either coil pair 35a, 35b or coil pair 35c, 35d depending upon which pair has a positive potential applied thereto. For example, if line 61 to coils 35a and 35b in response to a signal on line 31S has positive potential applied to it, the presence of a signal alternatively on line 63 and then on line 64 first causes control transistor 103 to conduct thereby causing power transistor 105 to conduct and allow current flow from line 61 through coil 35a, diode 107 and power transistor 105 to ground and then through coil 35b, diode 109 and power transistor 106. Similarly if potential is applied to line 60 current would flow through coil 35c to diode 108 and power transistor 105 and then through coil 35d diode 110 and power transistor 106 in response to the outputs on lines 63 and 64 from flip-flop 28.

Thus current can be alternately caused to flow through either coil pair by the presence of a signal on line 30S or 31S and a rotational step caused to be taken by the stepping motor 35 by the output of toggle flip-flop 28.

As stated above in conjunction with the discussion of the entire system of FIG. 1, the signal output of toggle flip-flop 28 occurs at a point in time correlated to occur when the error signal in response to pulsed transducer reference circuits is present on either line 31S or line 30S. As the flip-flop 28 is controlled from the clock 23 it is not operated when the clock 23 is not operated, and no power is consumed in the drive circuits or the motor circuits when the system is not in use.

Figure 4:
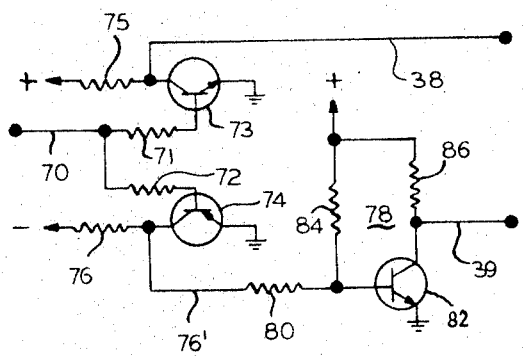
FIG. 4 is a circuit diagram of another circuit that may form part of the system of FIG. 1.

Referring to FIG. 4 there is depicted a preferred bi-polar voltage discriminator circuit that may be used with the system 10 of FIG. 1. In this circuit a bi-polar analog signal is fed from the differential amplifier 20 to input line 70. Connected to line 70 through current limiting resistors 71 and 72 are, respectively, the bases of an NPN transistor 73 and an PNP transistor 74. The emitters of both transistors are grounded. The collector of transistor 73 is connected through a resistor 75 to a source of positive potential while the collector of transistor 74 is connected through a resistor 76 to a source of negative potential. The collector of transistor 73 also has a first output line 38 connected thereto and the collector of transistor 74 has a line 76' connected thereto. Line 76' is connected to an inverter circuit 78 through a current limiting resistor 80. The circuit 78 includes a NPN transistor 82 whose base is connected to resistor 80 and also through a resistor 84 to a source of positive potential. The emitter of transistor 82 is grounded while its collector is connected through a resistor 86 to a source of positive potential and to an output line 39.

In operation, a signal of either polarity on line 70 will cut-off one of the two transistors 73, 74 while turning the other one. If transistor 74 is cut-off and transistor 73 is turned on the voltage on line 38 will fall to approximately that of ground. If the reverse condition occurs the voltage on line 76 will rise from negative to approximately that of ground. When the voltage on line 76 is negative the transistor 82 is cut-off and the output on line 39 is positive, however, when the voltage on line 76 rises to ground transistor 82 conducts thereby lowering the voltage on line 39 to approximately ground. Thus a signal change on line 38 or 39 is caused to occur depending upon whether or not the signal on line 70 is positive or negative.

Figure 5A:
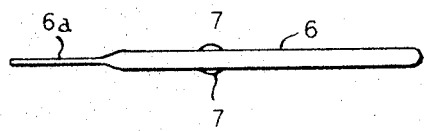
FIG. 5A is a plan view of a novel thermistor probe that may be used with the system of FIG. 1.

Referring to FIG. 5A there is depicted a preferred embodiment of the thermistor probe that may be used in one important application of the invention: the taking of human temperatures. The thermistor 6 is encased in an elongated cylindrical form approximately the size of commonly used oral thermometers and has an insulated wire 6a connected thereto. The wire 62 is connected to and forms part of a portable system 10. The probe 6 is equipped with detenting means 7 comprising a pair of oppositely positioned elongated fins or ribs which taper outwardly from the main body of the probe 6.

Figure 5B:
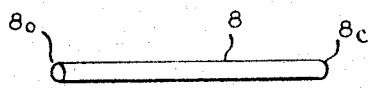
FIG. 5B is a similar view of a novel disposable boot attachment for the probe of FIG. 5.

In FIG. 5B is depicted a disposable boot 8 shaped to conform to the configuration of the probe 6 and thus being a generally elongated hollow cylindrical body with a rounded closed end 8c and a generally circular open end 8o. The boot 8 is preferably formed of highly heat transmittable material such as aluminum foil and is sized to snugly fit over the probe 6 by sliding its open end 8o until the forward end of the probe 6 meets the interior surface of the closed end 8c of the boot 8. In so advancing the boot 8 over the probe 6 the open end 8o meets and advances over the tapering ribs 7 to be slightly deformed thereby and detented on the probe 6.

In use, for example, by the duty nurse of a hospital ward, the temperature measuring system 10 of the present invention embodied in a portable battery powered unit with a thermistor probe 6 included a transducer 18 of the thermistor type connected thereto by an insulated cable 6a. A patient's temperature is taken by the nurse first placing a sterile boot 8 over the probe 6 and then inserting the probe into the part of the patient whose temperature is desired to be taken. The nurse, then without the delay usually necessitated by glass-mercury thermometers, simply presses the starter push button of starter unit 25. This starts the pulse train generating means of the system 10 which successive pulses the thermistor 18 of the probe 6 and compares the results with the pulsed result of the reference resistance circuit including the resistor 16 and alters the tap 16a setting thereof in steps. This is done by means of the step motor 35 which also drives the counter display whose displayed numbers are correlated and calibrated with the position of the tap 16a so as to display a number corresponding to the patient's temperature sensed by the thermistor 18. When the signals resulting from the pulsing of the thermistor 18 and the reference impedance are brought into relation with one another the system 10 turns itself off and the counter continues to display the patient's temperature.

In one constructed and tested embodiment of the invention the following circuit values were used:

| | Ohms |
|---|---|
| Resistors 15, 17 | 200 |
| Resistors 50, 57 | 220 |
| Variable resistor 16 | 0–1000 |
| Resistors 19 | 750 |
| Resistors 51, 56, 75, 86 | 500 |
| Resistors 54, 60, 67, 75a, 80 | 1000 |
| Resistors 65, 66 | 3000 |
| Resistor 84 | 2000 |
| Resistors 71, 72 | 10000 |

A thermistor transducer was used with a rated impedance of 750 ohms at 25° C. and a stepping motor of the 44,100 series manufactured by the A. W. Haydon Company having an input pulse range of 0–80 pulses per second, a 15° rotational step in either direction were employed. A standard "Veeder-Root" counter was used as the display device.

A system constructed in accordance with the above specified has been tested and found to be reliable and extremely quick acting. The system achieved an accuracy of better than 0.2° F. and a maximum measuring time of less than ten seconds with an average temperature taking time of two or three seconds.

The above specified values are exemplary and it is recognized and that it is well within the ordinary skill of those in the art to use the teaching and principles of the present invention with other values as well as various other of elements without departing from the spirit of the invention. It is particularly noted that solid state circuitry and construction could be advantageously employed.

As is now apparent a new and improved measuring and control system has been described which is adaptable to many useful applications and environments of use. The above described device is both easy to use and economical to make and has many advantages over the prior art devices and systems.

We claim:
1. A measuring and control system comprising:
   a start signal source;
   a pulse signal source operated responsive to said start signal source for generating a train of sampling pulses;
   a reference impedance circuit;
   a measuring circuit;
   means for coupling said pulse signal source simultaneously to said reference impedance circuit and to said measuring circuit;
   response sampling means coupled to said reference impedance circuit and to said measuring circuit for sampling the relative response of said reference impedance circuit and said measuring circuit to individual pulses of said train of sampling pulses; and
   means for producing error signals responsive to differences between the reference impedance circuit response and the measuring circuit response;
   drive means synchronized to said individual pulses and operated responsive to said error signals for moving the coupling point of said response sampling means to said reference impedance circuit in a direction to equalize the response of said reference impedance circuit and said measuring circuit;
   means for stopping the operation of said pulse signal source when the response of the reference impedance circuit and the response of the measuring circuit are substantially equal.
2. The measuring and control system as defined in claim 1 which further includes a display device operatively coupled to said drive means for displaying an indication of the state of said measuring circuit.
3. A measuring and control system comprising:
   a start signal source;
   a pulse signal source operated responsive to said start signal source for generating a train of sampling pulses;
   said pulse signal source comprising a gated clock and a one shot pulser driven by said gated clock;
   a reference impedance circuit;
   a measuring circuit;
   means coupling said pulse signal source simultaneously to said reference impedance circuit and to said measuring circuit;

response sampling means coupled to said reference impedance circuit and to said measuring circuit for sampling the relative response of said reference impedance circuit and said reference circuit to individual pulses of said train of sampling pulses;

means for producing an error signal responsive to a difference between the reference impedance circuit response and the measuring circuit response;

drive means operated responsive to said error signal for altering the coupling point of said response sampling means to said reference impedance circuit in a direction to equalize response of said reference impedance circuit and said measuring circuit; and means for stopping the operation of said pulse signal source when the response of the reference impedance and response of the measuring circuit are substantially equal.

4. The measuring and control system of claim 1 in which said reference impedance circuit includes a potentiometer having a movable tap which is moved in response to said drive means.

5. The measuring and control system as defined in claim 3 in which said response sampling means includes a differential amplifier for generating an output signal representative of at least the polarity of the difference between the response of said reference impedance circuit and the response of said measuring circuit to the individual pulses, and a bi-polar discriminator circuit having two output lines and being driven from said differential amplifier output signal for producing an output signal on one of said output lines when the differential amplifier output signal is of one polarity and for producing an output signal on the other of said output lines when the differential amplifier output signal is of the other polarity.

6. The measuring and control system as defined in claim 5 in which the output on each of said lines is a narrow gate pulse, and narrow gate sampling means operated at a time corresponding to that time when an output signal resulting from each of said sampling pulses is present on one of said lines.

7. The measuring and control system as defined in claim 6 in which said narrow gate sampling means includes two separate "And" circuits each having one input connected to a different one of said output lines and another input upon which is impressed a narrow pulse width signal derived from said sampling pulse signal source.

8. The measuring and control system as defined in claim 7 in which said narrow pulse signal is generated by a one shot pulser which is driven by another one shot pulser which is driven by a gated clock which clock forms part of said sampling pulse train signal source.

9. The measuring and control system as defined in claim 6 in which the output of one of said lines is coupled to a first flip-flop to set it in one state and the output of the other of said lines is coupled to a second flip-flop to set it in one state.

10. The measuring and control system, as defined in claim 1, further characterized by:

a bi-polar voltage discriminator connected to said error signal, said discriminator having two output lines to produce a voltage of a predetermined value on one of said lines when said error signal is positive and on the other of said lines when said error signal is negative, whereby said drive means acts in response to said error signal after it has been discriminated by said bipolar voltage discriminator.

11. A stepping motor drive control circuit for controlling the direction and occurrence of the rotational steps of the stepping motor having a first pair of coils for operation in a clockwise direction and a second pair of coils for operation in a counterclockwise direction, said circuit comprising:

a source of clockwise and counterclockwise command signals;

said source of clockwise and counterclockwise command signals including means for generating either a clockwise signal or a counterclockwise signal but not both at any time, said clockwise signal and said counterclockwise signals being of low power;

a source of direction current potential;

first current switching means coupled to said command signal source and activated by the clockwise command signal to couple said potential source to said clockwise coils, said first current switching means comprising a first control transistor coupled to said source of command signals and activated by the clockwise command signal, and a first power transistor coupled to said source of potential and to said first control transistor for activation in response thereto to couple said potential to said clockwise coils of said stepping motor;

second current switching means coupled to said command signal source for activation by the counterclockwise command signal to couple said potential source to said counterclockwise coils, said second current switching means comprising a second control transistor coupled to said source of command signal and activated by the counterclockwise command signal and a second power transistor coupled to said source of potential and to said first control transistor and activated in response thereto to couple said potential to said counterclockwise coils;

a source of step command signals for producing signals of low power and comprising first and second successive signals;

first step current switching means comprising a first step control transistor coupled to said step command signal source for activation by the first of said successive signals and a first step power transistor coupled to said first step control transistor for activation thereby and to one of the clockwise pair of motor coils and to one of the counterclockwise pair of motor coils for allowing current to flow through one of the coils of the pair of coils to which the potential is coupled; and second step current switching means comprising a second step control transistor coupled to said step command source for activation by the second of said successive signal outputs and a second step power transistor coupled to said second step control transistor for activation thereby, and to the other of the clockwise pair of motor coils and to the other of the counterclockwise pair of motor coils for allowing current to flow through the other coil of the pair of coils to which potential is coupled;

whereby said stepping motor is caused to step in either the clockwise or counterclockwise direction in response to a signal from said clockwise or counterclockwise command signal source and a step signal from said step signal source.

12. The measuring and control system as defined in claim 11, wherein said second step current switching means is further characterized by having four steering diodes with their cathodes connected to said step motor coils to prevent current from flowing through the coils of said step motor that are not energized at a certain time by said clockwise or counterclockwise command signals.

13. The measuring and control system as defined in claim 3 wherein said transducer comprises a thermistor probe unit comprising an elongated probe having a forward end containing a thermistor, a disposable boot sized and formed to said probe for covering at least a forward end thereof, and wherein said boot is made of a highly thermal conductive material.

(References on following page)

References Cited

UNITED STATES PATENTS

| | | |
|---|---|---|
| 2,450,263 | 9/1948 | Wise. |
| 1,960,350 | 5/1934 | Shackleton et al. |
| 2,653,308 | 9/1953 | Allen. |
| 2,938,385 | 5/1960 | Mack et al. |
| 3,076,338 | 2/1963 | Peltola. |
| 3,139,753 | 7/1964 | Brudner. |
| 3,364,744 | 1/1968 | McMahon. |

LOUIS R. PRINCE, Primary Examiner

FREDERICK SHOON, Assistant Examiner

U.S. Cl. X.R.

323—75